United States Patent [19]

Tokuda et al.

[11] 4,411,957
[45] Oct. 25, 1983

[54] MAGNETIC RECORDING MEDIUM

[75] Inventors: Fukunori Tokuda; Yutaka Nakashima, both of Komoro, Japan

[73] Assignee: TDK Electronics Co., Ltd., Tokyo, Japan

[21] Appl. No.: 412,164

[22] Filed: Aug. 27, 1982

[30] Foreign Application Priority Data

Sep. 3, 1981 [JP] Japan .................. 56-137727
Sep. 3, 1981 [JP] Japan .................. 56-137728
Sep. 18, 1981 [JP] Japan .................. 56-146119
Sep. 18, 1981 [JP] Japan .................. 56-146120

[51] Int. Cl.$^3$ .............................. H01F 10/02
[52] U.S. Cl. ......................... 428/425.9; 428/482; 428/522; 428/694; 428/900

[58] Field of Search .............. 428/425.9, 900, 694, 428/482, 522

*Primary Examiner*—Bernard D. Pianalto
*Attorney, Agent, or Firm*—Wyatt, Gerber, Shoup, Scobey & Badie

[57] ABSTRACT

A magnetic recording medium, consisting of a base coated with a magnetic coating material, uses as a binder a synthetic resin having a metal sulfonate group and a vinyl chloride-vinyl acetate copolymer containing not less than 8% vinyl alcohol, in which magnetic particles are dispersed. The binder may contain an isocyanate compound as a crosslinking agent for added particle durability.

6 Claims, 2 Drawing Figures

MAGNETIC RECORDING MEDIUM

This invention relates to a magnetic recording medium, and more specifically to a magnetic recording medium having a magnetic coating of highly dispersed magnetic particles, with excellent surface smoothness and durability.

For magnetic recording tapes, especially for video use, uniform dispersion of magnetic particles throughout the coating layer and a high degree of coating surface smoothness are requisites to high reproduction outputs at short wavelengths and to improved S/N. In addition, the tapes are required to possess adequate physical properties with which to stand repeated usage for long periods of time.

In attempts to meet these requirements, various resin combinations have been proposed for use as binders to yield better magnetic coatings. The proposals have generally proved beneficial so far as the physical properties of the products are concerned, but the dispersibility and surface smoothness are not beyond being improved yet. Techniques so far introduced to increase the dispersibility of magnetic particles have included the use of a surfactant as dispersing agent and increasing the hydrophilic group (e.g., the OH or COOH group) content in the molecules of the binder resin. The former brings about deterioration and undesired changes with the lapse of time of the physical properties due to the presence of the lower-molecular-weight surfactant in the magnetic coating. The latter achieves some improvements in both the particle dispersibility and the coating surface smoothness but fails to secure thorough dispersion where carbon black or other poorly dispersible substance is present or where the binder resin is used together with a less dispersing resin. Although an increase in dispersibility is usually accompanied with an improvement in surface smoothness, a poor-dispersant resin may be combined with a larger volume of a softer resin to provide a coating which can be smoothened on the surface by calendering or other finish to lower the modulation noise of the product medium. However, the finish cannot suppress the noise that would arise from insufficient particle dispersion. Moreover, the copious use of a soft resin is undesirable since it makes the magnetic coating susceptible to friction, with a plurality of durability and other desired properties.

One of the present inventors previously proposed, in copending Japanese Patent Application No. 132343/1980, a magnetic recording medium using a sodium sulfonate group-containing polyurethane or polyester resin or the like. The invention enabled the polyurethane resin or the like to have a strikingly improved dispersing action. However, the dispersibility tends to be materially affected when the resin is used together with another resin to modify the physical properties of the resulting magnetic recording medium.

The present invention provides a magnetic recording medium which eliminates the foregoing difficulties, achieves excellent particle dispersion, and has a magnetic coating with very smooth surface and good durability.

After extensive investigations and experiments, the present inventors have now found that excellent magnetic recording mediums can be obtained by use of a magnetic coating material which comprises as binder components a synthetic resin containing usually a metal sulfonate group, preferably sodium sulfonate group ($-SO_3Na$), as a constituent in the molecule and a vinyl chloride-vinyl acetate copolymer containing not less than 8% by weight of vinyl alcohol (on the basis of the copolymer weight) as a constituent in the molecule (the latter component being thus a vinyl chloride-vinyl acetate-vinyl alcohol copolymer). With this composition a magnetic recording medium is provided which has a magnetic coating wherein magnetic particles are thoroughly dispersed and which has surface smoothing and is durable in service.

Useful metal sulfonate group-containing synthetic resins for the invention include polyurethane and polyester resins.

A polyisocyanate as a curing agent may be added to the binder components in order to improve the mechanical properties of the coating.

The synthetic resins for use in the invention, such as polyurethane and polyester resins, that contain $-SO_3Na$ or other metal sulfonate groups have the groups as side chains. With a synthetic resin component of such a structure, a binder is provided which exhibits the same effect as attainable by the addition of a dispersing agent, without the drawbacks that would result from the use of the low molecular weight dispersant.

The vinyl chloride-vinyl acetate copolymer is used with a vinyl alcohol content of not less than 8% by weight of the copolymer. This vinyl alcohol proportion permits greatly improved dispersion of magnetic particles, allowing the copolymer to coat with the metal sulfonate group-containing resin to provide a magnetic recording medium with high degree of dispersion and surface smoothness.

The use of either binder component alone does not effect satisfactory improvements in dispersibility and other properties of the resulting medium.

The addition of a polyisocyanate to the magnetic coating material that contains the aforementioned binder components, to be followed by curing of the binder components, will impart the product medium with durability to withstand many repeated runs, in addition to the advantages already stated.

The $-SO_3Na$-containing polyurethane resin to be employed in the present invention is prepared by polycondensation of a dicarboxylic acid ingredient (terephthalic, isophthalic, sebacic, or similar acid), a polyhydric alcohol ingredient (ethylene glycol, neopentyl glycol, etc.), and a $-SO_3Na$-containing dicarboxylic acid ingredient (sodium 5-sulfoisophthalate, etc.) and then forming or polyurethane by reaction of the resulting polyester resin with diphenylmethane 4,4'-diisocyanate (MDI). Where necessary, one of varied combinations of dicarboxylic acids and polyhydric alcohols may be employed as the ingredients for a desired polyester resin. The isocyanate ingredient to be reacted with the polyester resin may be chosen from among various diisocyanate compounds, e.g., hexamethylene diisocyanate (HMDI), toluene diisocyanate (TDI), 1,5-naphthalene diisocyanate (NDI), tolidine diisocyanate (TODI), and lysine diisocyanate methyl ester (LDI).

The $-SO_3Na$-containing polyester resin for use in the present invention is prepared by polycondensation of a dicarboxylic acid ingredient (terephthalic, isophthalic, sebacic, or other similar acid), a polyhydric alcohol ingredient (ethylene glycol, neopenthyl glycol, etc.), and a $-SO_3Na$-containing dicarboxylic acid ingredient (sodium 5-sulfoisophthalate, etc.). Where desired, one of varied combinations of dicarboxylic acids, polyhydric alcohol, and metal sulfonate group-containing dicarboxylic acids may be used as the ingredients of the polyester resin.

The —SO₃Na-containing polyurethane or polyester resin contains about 10–1000 equivalents of —SO₃Na groups per 10⁴ g. If this value is lower than 10 the dispersability is adversely affected. If this value exceeds 1,000 the solubility of the polymer is solvents is poor.

The vinyl chloride-vinyl acetate copolymer to be used in the present invention contains not less than 8% vinyl alcohol (on the basis of the total binder weight) as compared with the usual content of about 0–4% in ordinary copolymers of the character. The hydrophilic —OH group in the vinyl alcohol coacts with the magnetic particle surface (which is also hydrophilic) to provide good wettability and hence improved dispersibility. (The —SO₃Na group in the polyurethane or polyester resin according to the invention acts even better.) However, in an amount of 0.5% the vinyl alcohol gives almost no such effect. Exceeding 6%, it begins to prove effective. The effect reaches a maximum with about 8% and remains saturated beyond that percentage. The vinyl chloride-vinyl acetate copolymer that contains over 8% vinyl alcohol exhibits itself a very good dispersibility, but it is only by use of the copolymer in combination with the highly dispersible resin according to the invention that such an excellently dispersible binder for magnetic recording medium that has never been available heretofore can be obtained.

The ratio of the So₃Na-containing resin to vinyl chloride vinyl acetate copolymer depends on the type of polyester or polyurethane but in general this ratio may vary between 50/50 and 20/80 when a curing agent is not used and between 60/40 and 40/60 when a curing agent is used. The greater the amount of polyester or polyurethane the lower is the durability of the recording medium. The greater the amount of vinylchloride vinylacetate copolymer the poorer the surface finish after calendering.

The combination of the —SO₃Na-containing polyurethane or polyester resin or the like and the vinyl chloride-vinyl acetate copolymer containing not less than 8% vinyl alcohol gives a binder which, in turn, can impart the resulting magnetic recording medium with not only desirable particle dispersibility and surface smoothness but also excellent running durability and other physical properties. In addition, the medium according to the invention is modified to stand satisfactorily and remain durable against heat on the high side (40°–50° C.) of the ambient temperature range it is likely to encounter in use. The end is attained by the addition of an isocyanate compound and the crosslinking of the whole mixture.

Useful isocyanate compounds for the invention are the compounds having two or more isocyanate groups or their adducts (including the adducts of dimers and trimers, and adducts with dihydric and trihydric alcohols).

Examples of the magnetic powders usable in practicing the invention are the particles of γ-iron oxide, cobalt-coated γ-iron oxide, cobalt-doped γ-iron oxide, CrO₂, magnetic alloys, and magnetic metals.

According to the necessary, an antistatic agent, carbon black, lubricant, nonmagnetic inorganic pigment, and/or the like may be added to the composition of the invention.

Figure 1:
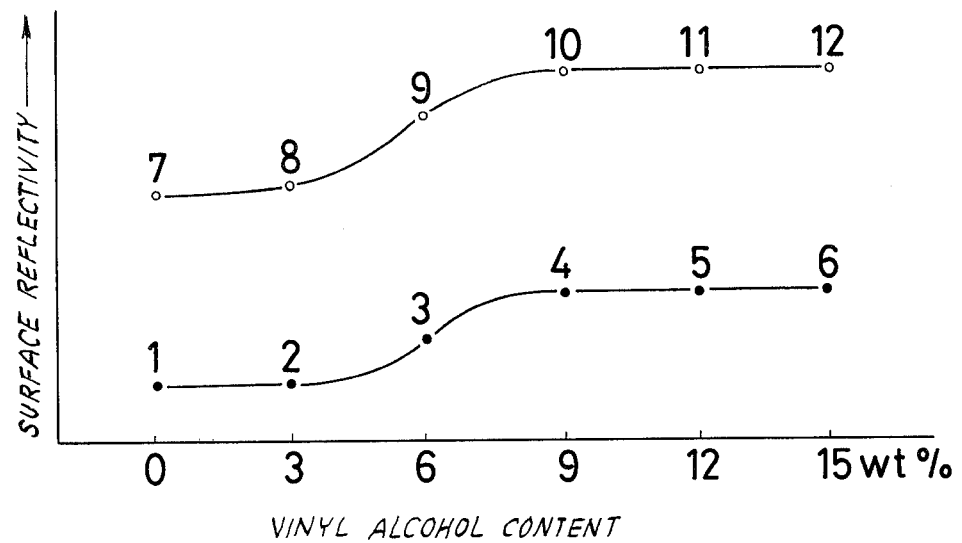
FIGS. 1 and 2 are graphs showing the effects of the vinyl alcohol content in the vinyl chloride-vinyl acetate copolymer and the sodium sulfonate group in the polyurethane and polyester resins, respectively, upon the surface reflectance of the resulting magnetic recording medium.

The invention is illustrated by the following examples.

The resins employed in the examples were of compositions tabulated below.

TABLE 1

| | Polyurethane resins | |
| --- | --- | --- |
| | -SO₃Na—contg. polyurethane resin* | Non-SO₃Na—contg. polyurethane resin* |
| Terephthalic acid | 15 mol % | 15 mol % |
| Sebacic acid | 30 mol % | 30 mol % |
| Sodium 5-sulfoisophthalic acid | 5 mol % | — |
| Isophthalic acid | — | 5 mol % |
| Ethylene glycol | 20 mol % | 20 mol % |
| Neopentyl glycol | 30 mol % | 30 mol % |

*Polyurethane resins having a molecular weight of about 20000 prepared by reacting each polyester resin of the above composition and having a molecular weight of about 2000 with MDI.

TABLE 2

| | Polyester resins | |
| --- | --- | --- |
| | -SO₃Na—contg. polyester resin* | Non-SO₃Na—contg. polyester resin* |
| Terephthalic acid | 15 mol % | 15 mol % |
| Sebacic acid | 30 mol % | 30 mol % |
| Sodium 5-sulfoisophthalic acid | 5 mol % | — |
| Isophthalic acid | — | 5 mol % |
| Ethylene glycol | 20 mol % | 20 mol % |
| Neopentyl glycol | 30 mol % | 30 mol % |

*Polyester resins having one of the above compositions and a molecular weight of about 20000.

TABLE 3

| | Vinyl chloride-vinyl acetate copolymers | | | | | |
| --- | --- | --- | --- | --- | --- | --- |
| Ingredient, wt % | (1) | (2) | (3) | (4) | (5) | (6) |
| Vinyl chloride | 97 | 94 | 91 | 88 | 85 | 82 |
| Vinyl alcohol | 0 | 3 | 6 | 9 | 12 | 15 |
| Vinyl acetate | 3 | 3 | 3 | 3 | 3 | 3 |

EXAMPLE 1

Using the polyurethane resins given in Table 1 and the vinyl chloride-vinyl acetate copolymers in Table 3 as binder components, coating compositions of the following formulations were prepared:

| | |
| --- | --- |
| Cobalt-coated γ-Fe₂O₃ | 400 parts by weight |
| Polyurethane resin (according to Table 4) | 50 |
| Vinyl chloride-vinyl acetate copolymer (according to Table 4) | 50 |
| Carbon black | 30 |
| Lubricant | 10 |
| Nonmagnetic inorganic pigment | 20 |
| Methyl ethyl ketone | 400 |

-continued

| | |
|---|---|
| Toluene | 400 |

In the above formulation, the combination of the binder components were varied in conformity with Table 4, and 12 different specimens (Specimens 1 to 12) were obtained.

TABLE 4

| | \multicolumn{12}{c}{Specimen} | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Non-SO₃Na— contg. polyurethane resin | O | O | O | O | O | O | | | | | | |
| -SO₃Na— contg. polyurethane resin | | | | | | | O | O | O | O | O | O |
| Vinyl chloride-vinyl acetate copolymer (1) | O | | | | | | O | | | | | |
| Vinyl chloride-vinyl acetate copolymer (2) | | O | | | | | | O | | | | |
| Vinyl chloride-vinyl acetate copolymer (3) | | | O | | | | | | O | | | |
| Vinyl chloride-vinyl acetate copolymer (4) | | | | O | | | | | | O | | |
| Vinyl chloride-vinyl acetate copolymer (5) | | | | | O | | | | | | O | |
| Vinyl chloride-vinyl acetate copolymer (6) | | | | | | O | | | | | | O |

Each composition was thoroughly mixed and dispersed in the usual manner to prepare a magnetic coating material. It was applied on a polyethylene terephthalate film to form a 5 μm-thick layer on drying, and then was dried.

The magnetic coatings of the magnetic recording medium thus obtained were tested for their surface reflexibilities. The results are graphically represented in FIG. 1. The reflectivity is the value determined of the coating surface before calendering. It is an appropriate index of the particle dispersibility in the coating and is also suggestive of good surface quality of the calendered coating.

As can be seen from the graph, the —SO₃Na group contained in the polyurethane resin markedly improves the surface smoothness of the magnetic recording medium. Also, the vinyl alcohol content of the vinyl chloride-vinyl acetate copolymer, when adjusted to over 6%, will make the surface smoother. The content of about 8% will achieve a further, notable improvement, but beyond about 8%, the smoothening effect will be saturated.

The magnetic recording medium made in this way was then calendered for a mirror finish of the magnetic coating surface, and was cut into ribbons of a predetermined width to obtain magnetic recording tapes. Each tape was tested by repeated one-hundred runs (back and forth from hub to hub past VTR playback heads). All the tapes performed well, showing nothing to be desired.

As will be obvious from the foregoing, the magnetic recording medium that uses as binder components a —SO₃Na-containing polyurethane resin and a vinyl chloride-vinyl acetate copolymer containing not less than 8% vinyl alcohol on the basis of the copolymer weight is excellent in dispersibility and surface smoothness and, besides, possesses great durability.

EXAMPLE 2

Twenty parts by weight of "Desmodur L" (the trade designation of an isocyanate compound marketed by Bayer AG) was added to the coating composition of Specimen 12, one of the best compositions in the group of Specimens 1 to 12 in Example 1. The mixture was applied, dried, and the resulting coating layer was calendered by the same process and method as used with the 12 specimens in the preceding example. The calendered coating was cured by a heat treatment at a predetermined temperature, and the medium was cut into a ribbon of a suitable width to obtain a magnetic recording tape (hereinafter called the "example tape"). On the other hand, the magnetic recording medium of Specimen 12 was calendered directly and cut likewise to a tape form (hereinafter called the "comparative tape"). Comparative tests gave results as shown in Table 5.

TABLE 5

| | Comparative tape | Example tape |
|---|---|---|
| Surface quality | \multicolumn{2}{c}{Equal} | |
| At 20° C. | 150–200 runs choked the heads. | 300 runs were performed satisfactorily. |
| At 40° C. | 100–150 runs choked the heads. | 300 runs were performed satisfactorily. |

The results indicate that the magnetic recording medium made by using the —SO₃Na-containing polyurethane resin and the vinyl chloride-vinyl acetate copolymer containing not less than 8% vinyl alcohol as the binder components and the isocyanate compound as a crosslinking agent is superior in dispersibility, surface quality, and durability.

EXAMPLE 3

With one of the polyester resins in Table 2 and one of the vinyl chloride-vinyl acetate copolymers in Table 3 as the binder components, compositions of the following formulation were prepared:

| | |
|---|---|
| Cobalt-coated γ-Fe₂O₃ | 400 parts by weight |
| Polyester resin (according to Table 6) | 50 |
| Vinyl chloride-vinyl acetate copolymer (according to Table 6) | 50 |
| Carbon black | 30 |
| Lubricant | 10 |
| Nonmagnetic inorganic pigment | 20 |
| Methyl ethyl ketone | 400 |
| Toluene | 400 |

In the above formulation, the combination of the binder components were varied in conformity with Table 6, and 12 different specimens (Specimens 13 to 24) were obtained.

TABLE 6

| | Specimen | | | | | | | | | | | |
|---|---|---|---|---|---|---|---|---|---|---|---|---|
| | 13 | 14 | 15 | 16 | 17 | 18 | 19 | 20 | 21 | 22 | 23 | 24 |
| Non-SO₃Na—contg. polyester resin | O | O | O | O | O | O | | | | | | |
| -SO₃Na—contg. polyester resin | | | | | | | O | O | O | O | O | O |
| Vinyl chloride-vinyl acetate copolymer (1) | O | | | | | | O | | | | | |
| Vinyl chloride-vinyl acetate copolymer (2) | | O | | | | | | O | | | | |
| Vinyl chloride-vinyl acetate copolymer (3) | | | O | | | | | | O | | | |
| Vinyl chloride-vinyl acetate copolymer (4) | | | | O | | | | | | O | | |
| Vinyl chloride-vinyl acetate copolymer (5) | | | | | O | | | | | | O | |
| Vinyl chloride-vinyl acetate copolymer (6) | | | | | | O | | | | | | O |

Each composition was thoroughly mixed and dispersed in the usual manner to prepare a magnetic coating material. It was applied on a polyethylene terephthalate film to form a 5 μm-thick layer on drhing, and then was dried.

Figure 2:
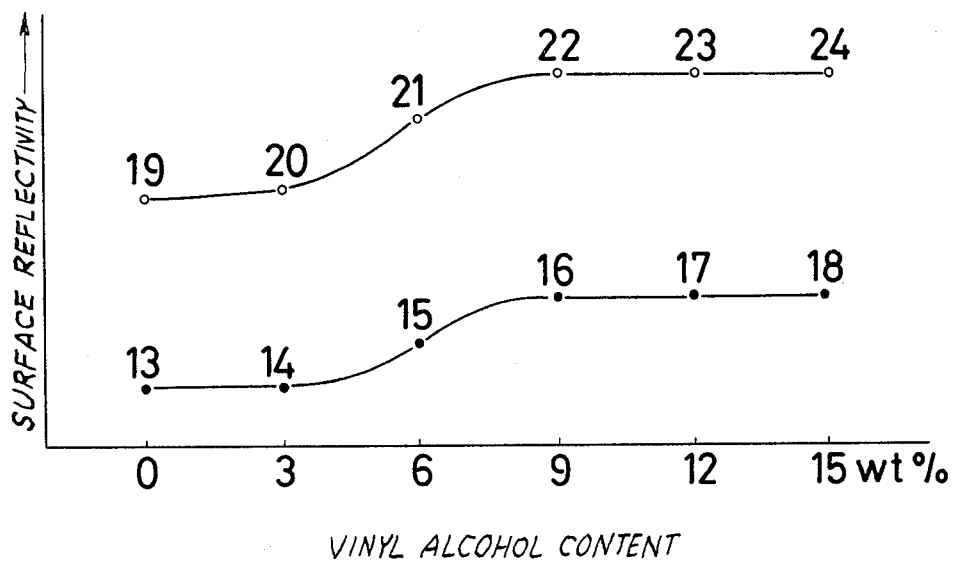

The magnetic coatings of the magnetic recording medium thus obtained were tested for their surface reflexibilities. The results are graphically represented in FIG. 2. The numerals 13 to 24 on the curves represent, respectively, Specimens 13 to 24 in Table 6. The reflectivity is the value determined of the coating surface before calendering.

As is obvious from the graph, the —SO₃Na group contained in the polyester resin greatly improves the surface smoothness of the magnetic recording medium. Also, the vinyl alcohol content of the vinyl chloride-vinyl acetate copolymer, when adjusted to 6% or more, will make the surface smoother. The content of about 8% will achieve a further, notable improvement, but beyond about 8%, the smoothening effect will remain saturated.

The magnetic recording medium thus obtained was then calendered for a mirror finish of its magnetic coating surface and cut into ribbons of a given width to form magnetic recording tapes. Each tape was tested by repeated onehundred runs (back and forth from hub to hub past VTR playback heads), and the results were quite satisfactory.

As demonstrated above, the magnetic recording medium that uses as binder components a $—SO_{Na\text{-}containing}$ polyester resin and a vinyl chloride-vinyl acetate copolymer containing not less than 8% vinyl alcohol on the basis of the binder weight proves excellent in dispersibility and surface smoothness and, moreover, possesses great durability.

EXAMPLE 4

To specimen 24, one of the best coating compositions in the group of Specimens 13 to 24 in Example 3, 20 parts by weight of "Desmodur L" (Bayer's trademarked isocyanate compound) was added. The mixture was applied, dried, and the resulting coating layer was calendered by the same process and method as used with Specimens 13 to 24. The calendered coating was cured by a heat treatment at a predetermined temperature, and the medium was cut into a ribbon of a suitable width to obtain a magnetic recording tape (hereinafter called the "example tape"). On the other hand, the magnetic recording medium of Specimen 24 was calendered directly and cut likewise to a tape form (hereinafter called the "comparative tape"). The results of comparative tests were as given in Table 7.

TABLE 7

| | Comparative tape | Example tape |
|---|---|---|
| Surface quality | Equal | |
| At 20° C. | 150-200 runs choked the heads. | 300 runs were performed satisfactorily. |
| At 40° C. | 100-150 runs choked the heads. | 300 runs were performed satisfactorily. |

The results indicate that the magnetic recording medium made by using the —SO₃Na-containing polyester resin and the vinyl chloride-vinyl acetate copolymer containing not less than 8% vinyl alcohol as the binder components and the isocyanate compound as a cross-linking agent is superior in dispersibility, surface quality, and durability.

While the invention has been illustrated by some examples it will be obvious to those skilled in the art that the invention may be otherwise variously embodied with changes and modifications without departing from the spirit and scope of the invention.

What is claimed is:

1. A magnetic recording medium comprising a base and a magnetic coating material applied thereon, said coating being made of a binder which consists of a synthetic resin having a metal sulfonate group and a vinyl chloride-vinyl acetate copolymer containing not less than 8% vinyl alcohol on the basis of the weight of the copolymer, and magnetic particles dispersed in said binder.

2. A magnetic recording medium according to claim 1 wherein said metal sulfonate group is —SO₃Na.

3. A magnetic recording medium according to claim 1 or 2 wherein said synthetic resin having said metal sulfonate group is selected from the class consisting of polyurethane and polyester resins.

4. A magnetic recording medium comprising a base and a magnetic coating material applied thereon, said coating being made of a binder which consists of a synthetic resin having a metal sulfonate group and a vinyl chloride-vinyl acetate copolymer containing not less than 8% vinyl alcohol on the basis of the copolymer weight, said binder containing an isocyanate compound as a crosslinking agent, and magnetic particles dispersed in said binder.

5. A magnetic recording medium according to claim 4 wherein said metal sulfonate group is —SO$_3$Na.

6. A magnetic recording medium according to claim 4 or 5 wherein said synthetic resin having said metal sulfonate group is selected from the class consisting of polyurethane and polyester resins.

* * * * *